(12) United States Patent
Chimbe et al.

(10) Patent No.: US 10,167,947 B2
(45) Date of Patent: Jan. 1, 2019

(54) CONTROL DEVICE OF VEHICLE

(71) Applicant: TOYOTA JIDOSHA KABUSHIKI KAISHA, Toyota-shi, Aichi (JP)

(72) Inventors: Tomohiro Chimbe, Kariya (JP); Norihiro Tsukamoto, Toyota (JP); Keisuke Ota, Toyota (JP); Tomohiro Asami, Nisshin (JP); Yuji Kajiyama, Anjo (JP); Daiki Fukuda, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 15/643,943

(22) Filed: Jul. 7, 2017

(65) Prior Publication Data

US 2018/0023694 A1 Jan. 25, 2018

(30) Foreign Application Priority Data

Jul. 22, 2016 (JP) ................................. 2016-144960

(51) Int. Cl.
| | | |
|---|---|---|
| *F16H 61/02* | (2006.01) | |
| *F16H 61/08* | (2006.01) | |
| *F16H 59/14* | (2006.01) | |
| *F16H 59/70* | (2006.01) | |

(Continued)

(52) U.S. Cl.
CPC ......... *F16H 61/0213* (2013.01); *F16H 61/08* (2013.01); *F16H 59/14* (2013.01); *F16H 59/70* (2013.01); *F16H 59/72* (2013.01); *F16H 2061/0466* (2013.01)

(58) Field of Classification Search
CPC ....... F16H 59/14; F16H 61/0213; F16H 61/08
See application file for complete search history.

(56) References Cited

U.S. PATENT DOCUMENTS

| | | | |
|---|---|---|---|
| 6,503,165 B1 | 1/2003 | Kubo et al. | |
| 2001/0003721 A1* | 6/2001 | Saito .................... | F16H 61/061 477/115 |
| 2005/0037893 A1 | 2/2005 | Siebigteroth et al. | |

(Continued)

FOREIGN PATENT DOCUMENTS

| | | |
|---|---|---|
| DE | 195 22 834 A1 | 1/1997 |
| DE | 100 52 696 A1 | 4/2001 |

(Continued)

*Primary Examiner* — Edwin A Young
(74) *Attorney, Agent, or Firm* — Oliff PLC

(57) ABSTRACT

A control device of a vehicle including a multi-speed transmission having plurality of gear positions different in gear ratio selectively established by controlling engagement and release predetermined engagement devices out of plurality engagement devices, the control device involves: shift control portion configured to provide delay control of delaying time point starting provision of release-side torque phase control reducing a torque capacity of release-side engagement device by a preset delay time with respect to time point of starting provision of a torque phase control of generating a torque capacity of an engagement-side engagement device during a torque phase in a drive upshift; and a delay time setting portion configured to preset the delay time such that the delay time is shortened when a shared torque of the release-side engagement device before start of the torque phase in the drive upshift is high, as compared to when the shared torque is low.

5 Claims, 6 Drawing Sheets

(51) Int. Cl.
*F16H 59/72* (2006.01)
*F16H 61/04* (2006.01)

(56) References Cited

U.S. PATENT DOCUMENTS

| | | | |
|---|---|---|---|
| 2008/0029063 A1* | 2/2008 | Tokura | B60W 10/06 |
| | | | 123/395 |
| 2010/0318269 A1* | 12/2010 | Yanakiev | F16H 61/061 |
| | | | 701/55 |
| 2014/0195131 A1* | 7/2014 | Porto | F16H 61/688 |
| | | | 701/60 |
| 2015/0184740 A1 | 7/2015 | Masunaga et al. | |

FOREIGN PATENT DOCUMENTS

| | | |
|---|---|---|
| EP | 1 507 103 A1 | 2/2005 |
| JP | 2016-023660 A | 2/2016 |
| WO | 2014/020685 A1 | 2/2014 |

* cited by examiner

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

O: ENGAGEMENT   BLANK: RELEASE

CONTROL DEVICE OF VEHICLE

INCORPORATION BY REFERENCE

The disclosure of Japanese Patent Application No. 2016-144960 filed on Jul. 22, 2016 including the specification, drawings and abstract is incorporated herein by reference in its entirety.

TECHNICAL FIELD

The present invention relates to a control device of a vehicle including a multi-speed transmission having a plurality of gear positions different in gear ratio selectively established.

BACKGROUND ART

A control device of a vehicle is well known as a control device of a vehicle including a multi-speed transmission having a plurality of gear positions different in gear ratio selectively established by controlling engagement and release of predetermined engagement devices out of a plurality of engagement devices. For example, this corresponds to a vehicle control device described in Patent Document 1. In Patent Document 1, it is disclosed that, when gears are shifted in an automatic transmission where the gear shifting is achieved by switching engagement and release of engagement devices, a transmission torque of a release-side engagement device (the engagement device to be released) starts decreasing before completing the packing of an engagement-side engagement device (the engagement device to be engaged), resulting in an insufficient total transmission torque of the engagement-side engagement device and the release-side engagement device possibly causing a shift shock and that, in this regard, by estimating a time required for the packing of the engagement-side engagement device based on oil temperature of the automatic transmission and by providing a temporal difference in timing of output between an increase start command for the transmission torque related to the engagement-side engagement device and a decrease start command for the transmission torque related to the release-side engagement device based on the time required for the packing, the shift shock due to the insufficient total transmission torque is suppressed.

PRIOR ART DOCUMENT

Patent Document

Patent Document 1: Japanese Laid-Open Patent Publication No. 2016-23660

SUMMARY OF THE INVENTION

Problem to be Solved by the Invention

By providing a temporal difference in timing of output between an increase start command for a transmission torque related to an engagement-side engagement device and a decrease start command for a transmission torque related to a release-side engagement device so as to prevent a total transmission torque of the engagement-side engagement device and the release-side engagement device from becoming insufficient at the time of a shift of a multi-speed transmission, a transfer of a torque between the release-side engagement device and the engagement-side engagement device is controlled to a tie-up side (likely to tie-up). In a region of a relatively high input shaft torque of a multi-speed transmission, an inertia phase may not be started unless torque capacity of the engagement-side engagement device is increased in accordance with the controlling to the tie-up side. However, if the torque capacity of the engagement-side engagement device is increased with a differential rotation, a frictional load in the engagement-side engagement device increases and may cause a deterioration in durability.

The present invention was conceived in view of the situations and it is therefore an object of the present invention to provide a control device of a vehicle capable of providing a tie-up control corresponding to a frictional load of an engagement-side engagement device during a torque phase in a drive upshift.

Solution to Problem

The object indicated above is achieved according to a first aspect of the present invention, which provides a control device of a vehicle including (a) a multi-speed transmission having a plurality of gear positions different in gear ratio selectively established by controlling engagement and release of predetermined engagement devices out of a plurality of engagement devices, the control device comprising: (b) a shift control portion providing a delay control of delaying a time point of starting provision of a release-side torque phase control reducing a torque capacity of a release-side engagement device by a preset delay time with respect to a time point of starting provision of a torque phase control generating a torque capacity of an engagement-side engagement device during a torque phase in a drive upshift; and (c) a delay time setting portion presetting the delay time such that the delay time is shortened when a shared torque of the release-side engagement device before start of the torque phase in the drive upshift is high, as compared to when the shared torque is low.

A second aspect of the present invention provides the control device of a vehicle recited in the first aspect of the present invention, wherein the delay time setting portion sets the delay time such that delay time is made longer in a region in which a torque sharing ratio of the release-side engagement device is equal to or less than a predetermined sharing ratio in terms of a torque sharing ratio between the release-side engagement device and the engagement-side engagement device in transition of the drive upshift after the start of the delay control, as compared to in a region in which the torque sharing ratio of the release-side engagement device exceeds the predetermined sharing ratio.

A third aspect of the present invention provides the control device of a vehicle recited in the first or second aspect of the present invention, wherein the shift control portion terminates the delay control when the inertia phase in the drive upshift is started.

A fourth aspect of the present invention provides the control device of a vehicle recited in any one of the first to third aspects of the present invention, wherein the delay time setting portion sets the delay time based on a gear position of the drive upshift destination of the multi-speed transmission.

A fifth aspect of the present invention provides the control device of a vehicle recited in any one of the first to fourth aspects of the present invention, wherein the delay time setting portion sets the delay time such that the delay time is shortened when the predetermined engagement devices have low responsiveness due to a temperature of hydraulic fluid for shift control of the multi-speed transmission before start of the torque phase in the drive upshift, as compared to when the responsiveness is high.

Advantageous Effects of the Invention

According to the first aspect of the present invention, in the presetting of the delay time in the delay control of delaying the time point of starting the provision of the release-side torque phase control of reducing the torque capacity of the release-side engagement device with respect to the time point of starting the provision of the torque phase control of generating the torque capacity of the engagement-side engagement device during the torque phase in the drive upshift, the delay time is shortened when the shared torque of the release-side engagement device before the start of the torque phase in the drive upshift is high, as compared to when the shared torque is low, and therefore, the drive upshift can be performed with a tie-up corresponding to the frictional load of the engagement-side engagement element changing in accordance with the input torque of the multi-speed transmission that is the basis of the shared torque of the release-side engagement device before the start of the torque phase. Thus, the tie-up control corresponding to the frictional load of the engagement-side engagement element can be provided during the torque phase in the drive upshift.

According to the second aspect of the present invention, in the region in which the torque sharing ratio of the release-side engagement device in transition of the drive upshift is equal to or less than the predetermined sharing ratio after the start of the delay control, the delay time is set longer as compared to the region in which the torque sharing ratio exceeds the predetermined sharing ratio, and therefore, the reduction in the torque capacity of the release-side engagement device is alleviated in the region in which the torque capacity of the release-side engagement device becomes lower, so that the tie-up at the start of the inertia phase is stabilized.

According to the third aspect of the present invention, when the inertia phase in the drive upshift is started, the delay control is terminated, so that the stagnation of the drive upshift due to tie-up can be prevented or suppressed.

According to the fourth aspect of the present invention, since the delay time is set based on the gear position of the drive upshift destination of the multi-speed transmission, the drive upshift can be performed with the tie-up corresponding to the frictional load of the engagement-side engagement device in accordance with the gear position of the drive upshift destination.

According to the fifth aspect of the present invention, since the delay time is set in accordance with the hydraulic fluid temperature before the start of the torque phase in the drive upshift, the stability of control during the torque phase can be improved with respect to a change in the hydraulic fluid temperature.

MODES FOR CARRYING OUT THE INVENTION

An example of the present invention will now be described in detail with reference to the drawings.

Example

Figure 1:
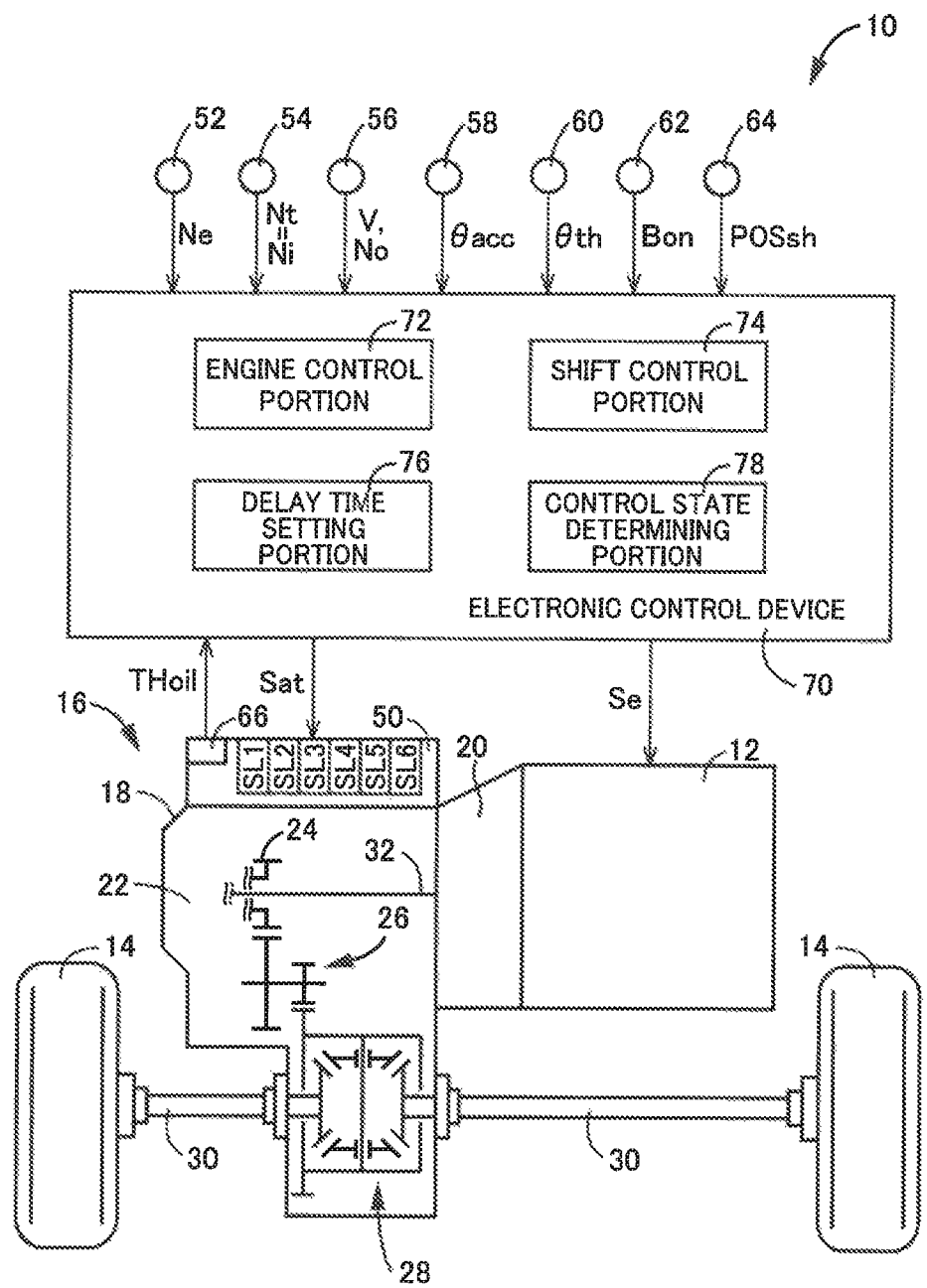
FIG. 1 is a diagram for explaining a general configuration of a vehicle to which the present invention is applied and is a diagram for explaining main portions of a control function and a control system for various controls in the vehicle.

FIG. 1 is a diagram for explaining a general configuration of a vehicle 10 to which the present invention is applied and is a diagram for explaining main portions of a control system for various controls in the vehicle 10. In FIG. 1, the vehicle 10 includes an engine 12, drive wheels 14, and a vehicle power transmission device 16 (hereinafter referred to as a power transmission device 16) disposed in a power transmission path between the engine 12 and the drive wheels 14. The power transmission device 16 includes, in a case 18 acting as a non-rotating member attached to a vehicle body, a torque converter 20, an automatic transmission 22, a reduction gear mechanism 26 coupled to a transmission output gear 24 that is an output rotating member of the automatic transmission 22, a differential gear (differential gear device) 28 coupled to the reduction gear mechanism 26, etc. The power transmission device 16 also includes a pair of drive shafts (axles) 30 etc. coupled to the differential gear 28. In the power transmission device 16, the power (synonymous with torque and force if not particularly distinguished) output from the engine 12 is transmitted sequentially through the torque converter 20, the automatic transmission 22, the reduction gear mechanism 26, the differential gear 28, the drive shaft 30, etc. to the driving wheels 14.

The engine 12 is a drive force source of the vehicle 10 and is a known internal combustion engine such as a gasoline engine and a diesel engine. In the engine 12, engine torque Te is controlled through control of an operational state such as an intake air amount, a fuel supply amount, and an ignition timing by an electronic control device 70 described later.

Figures 2, 3:
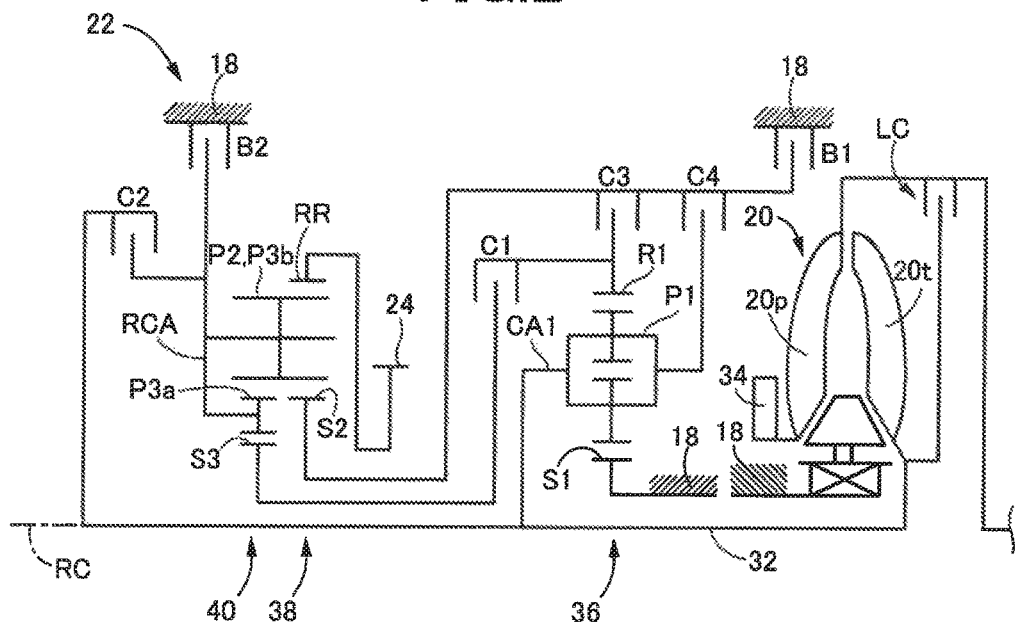
FIG. 2 is a schematic for explaining an example of a torque converter and an automatic transmission.
FIG. 3 is an operation chart for explaining a relationship between a shift operation of the automatic transmission and a combination of operations of engagement devices used therefor.

FIG. 2 is a schematic for explaining an example of the torque converter 20 and the automatic transmission 22. The torque converter 20, the automatic transmission 22, etc. are configured substantially symmetrically with respect to an axial center RC of a transmission input shaft 32 that is an input rotating member of the automatic transmission 22 and have lower halves from the axial center RC not shown in FIG. 2.

In FIG. 2, the torque converter 20 is disposed to rotate around the axial center RC in a power transmission path between the engine 12 and the automatic transmission 22 and is a fluid transmission device including a pump impeller 20p coupled to the engine 12, a turbine impeller 20t coupled to the transmission input shaft 32, etc. The transmission input shaft 32 also serves as a turbine shaft rotationally driven by the turbine impeller 20t. The power transmission device 16 also includes a lockup clutch LC capable of direct coupling between the pump impeller 20p and the turbine impeller 20t (i.e., between input/output rotating members of the torque converter 20). The power transmission device 16 also includes a mechanical oil pump 34 coupled to the pump impeller 20p. The oil pump 34 is rotationally driven by the engine 12 to discharge hydraulic fluid used for a shift control of the automatic transmission 22 and for supplying lubrication oil to portions of the power transmission path of the power transmission device 16. Therefore, the hydraulic fluid pumped up by the oil pump 34 is supplied as a source pressure of a hydraulic control circuit 50 (see FIG. 1) included in the vehicle 10.

The automatic transmission 22 is a multi-speed type automatic transmission constituting a portion of the power transmission path between the engine 12 and the drive wheels 14. The automatic transmission 22 is a planetary gear type multi-speed transmission having a double pinion type first planetary gear device 36 as well as a single pinion type second planetary gear device 38 and a double pinion type third planetary gear device 40 formed as a Ravigneaux type, on a coaxial line (on the axial center RC). The automatic transmission 22 includes a first clutch C1, a second clutch C2, a third clutch C3, a fourth clutch C4, a first brake B1, and a second brake B2 as a plurality of engagement devices (hereinafter simply referred to as engagement devices C if not particularly distinguished).

The first planetary gear device 36 includes a first sun gear S1, a plurality of pairs of first planetary gears P1 meshing with each other, a first carrier CA1 supporting the first planetary gear P1 such that the first planetary gear P1 is rotatable about its axis and an axis of the first planetary gear device, and a first ring gear R1 meshing via the first planetary gear P1 with the first sun gear S1. The second planetary gear device 38 includes a second sun gear S2, a second planetary gear P2, a carrier RCA supporting the second planetary gear P2 such that the second planetary gear P2 is rotatable about its axis and an axis of the second planetary gear device, and a ring gear RR meshing via the second planetary gear P2 with the second sun gear S2. The third planetary gear device 40 includes a third sun gear S3, a plurality of pairs of third planetary gears P3a, P3b meshing with each other, a carrier RCA supporting the third planetary gears P3a, P3b such that the third planetary gears P3a, P3b are rotatable about its axis and an axis of the third planetary gear device, and a ring gear RR meshing via the third planetary gears P3a, P3b with the third sun gear S3. In the second planetary gear device 38 and the third planetary gear device 40, the third planetary gear P3b and the second planetary gear P2 are commonalized, and the carriers are made up of the common carrier RCA while the ring gears are made up of the common ring gear RR, so that a so-called Ravigneaux type is achieved.

The engagement devices C are hydraulic friction engagement devices made up of wet multiplate type clutches and brakes pressed by hydraulic actuators, band brakes fastened by hydraulic actuators, etc. The engagement devices C have respective torque capacities (clutch torques) Tc (i.e., clutch torques Tc1, Tc2, Tc3, Tc4, Tb1, Tb2) changed in accordance with hydraulic pressures (clutch pressures) Pc (i.e., clutch pressures Pc1, Pc2, Pc3, Pc4, Pb1, Pb2) output respectively from solenoid valves SL1 to SL6 etc. in the hydraulic control circuit 50, so that the respective operation states (states such as engagement and release) are switched. To transmit a torque (e.g., an input torque Ti, i.e., a turbine torque Tt, input to the transmission input shaft 32) between the transmission input shaft 32 and the transmission output gear 24 without slipping the engagement devices C (i.e., without generating a differential rotation speed in the engagement devices C), each of the engagement devices C needs to have a torque capacity capable of providing a transmission torque that must be assigned to the engagement device C (i.e., a shared torque of the engagement device C) with respect to the torque. However, at the torque capacity capable of providing the transmitted torque, the transmission torque does not increase even if the torque capacity is increased. In this example, the clutch torque Tc and the clutch pressure Pc may synonymously be used for convenience.

In the automatic transmission 22, the first sun gear S1 is coupled to the case 18. The first carrier CA1 is coupled to the transmission input shaft 32. The first carrier CA1 and the second sun gear S2 are selectively coupled via the fourth clutch C4. The first ring gear R1 and the third sun gear S3 are selectively coupled via the first clutch C1. The first ring gear R1 and the second sun gear S2 are selectively coupled via the third clutch C3. The second sun gear S2 is selectively coupled via the first brake B1 to the case 18. The carrier RCA is selectively coupled via the second clutch C2 to the transmission input shaft 32. The carrier RCA is selectively coupled via the second brake B2 to the case 18. The ring gear RR is coupled to the transmission output gear 24.

The automatic transmission 22 is a multi-speed transmission having a plurality of gear positions (gear shift positions) different in gear ratio (speed change ratio) γ (=AT input rotation speed Ni/AT output rotation speed No) selectively established by controlling engagement and release of predetermined engagement devices out of a plurality of the engagement devices C by the electronic control device 70 described later in accordance with a driver's accelerator operation, a vehicle speed V, etc. For example, as shown in an engagement operation table in FIG. 3, the automatic transmission 22 has eight forward gear positions from a first speed gear position "1st" to an eighth speed gear position "8th" and a reverse gear position "Rev" such that the gear positions are selectively established. The AT input rotation speed Ni is the rotation speed of the transmission input shaft 32 and the AT output rotation speed No is the rotation speed of the transmission output gear 24. The gear ratio γ of the automatic transmission 22 corresponding to each of the gear positions is appropriately defined by gear ratios (=the number of teeth of the sun gear/the number of teeth of the ring gear) ρ1, ρ2, and ρ3 of the first planetary gear device 36, the second planetary gear device 38, and the third planetary gear device 40. The gear ratio γ is the highest at the first speed gear position "1st" and decreases toward the higher vehicle speed side (the eighth speed gear position "8th" side).

The engagement operation table of FIG. 3 represents the relationship between the gear positions established in the automatic transmission 22 and the operation states of the engagement devices C, and "o" and a blank indicate engagement and release of the engagement devices C, respectively. As shown in FIG. 3, among the forward gear positions, the first speed gear position "1st" is established by engagement of the first clutch C1 and the second brake B2. The second speed gear position "2nd" is established by engagement of the first clutch C1 and the first brake B. The third speed gear position "3rd" is established by engagement of the first clutch C1 and the third clutch C3. The fourth speed gear position "4th" is established by engagement of the first clutch C1 and the fourth clutch C4. The fifth speed gear position "5th" is established by engagement of the first clutch C1 and the second clutch C2. The sixth speed gear position "6th" is established by engagement of the second clutch C2 and the fourth clutch C4. The seventh speed gear position "7th" is established by engagement of the second clutch C2 and the third clutch C3. The eighth speed gear position "8th" is established by engagement of the second clutch C2 and the first brake B1. The reverse gear position "Rev" is established by engagement of the third clutch C3 and the second brake B2. When the engagement devices C are all released, the automatic transmission 22 is brought into a neutral state in which no gear position is established (i.e., a neutral state in which power transmission is interrupted).

Returning to FIG. 1, the vehicle 10 includes the electronic control device 70 including a control device of the vehicle 10 related to the shift control of the automatic transmission 22, for example. Therefore, FIG. 1 is a diagram of an input/output system of the electronic control device 70 and is a functional block diagram for explaining a main portion of the control function by the electronic control device 70. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 12, the shift control of the automatic transmission 22, etc., and is configured separately for the engine output control, the hydraulic control (the shift control), etc., as needed.

The electronic control device 70 is supplied with various signals (e.g., an engine rotation speed Ne, the AT input rotation speed Ni that is also the rotation speed of the turbine shaft (i.e., a turbine rotation speed Nt), the AT output rotation speed No corresponding to the vehicle speed V, an accelerator opening degree θacc that is an operation amount of an accelerator pedal, a throttle valve opening degree θth that is an opening degree of an electronic throttle valve, a brake-on Bon that is a signal indicative of a brake operation state when a driver operates a brake operation member for operating a wheel brake, a shift-lever operation position (shift position) POSsh such as "P", "R", "N", and "D", etc., and a hydraulic fluid temperature THoil that is a temperature of hydraulic fluid in the hydraulic control circuit 50) based on detection values from various sensors etc. disposed in the vehicle 10 (e.g., an engine rotation speed sensor 52, an input rotation speed sensor 54, an output rotation speed sensor 56, an accelerator opening degree sensor 58, a throttle valve opening degree sensor 60, a brake switch 62, a shift position sensor 64, and an oil temperature sensor 66). The electronic control device 70 supplies various devices included in the vehicle 10 (e.g., the engine 12 and the hydraulic control circuit 50) with various command signals (e.g., an engine control command signal Se and a hydraulic control command signal Sat). This hydraulic pressure control command signal Sat is a command signal (hydraulic pressure command value, instruction pressure) for driving the solenoid valves SL1 to SL6 regulating the clutch pressures Pc supplied to the hydraulic actuators of the engagement devices C and is output to the hydraulic control circuit 50.

To implement the control function for various controls in the vehicle 10, the electronic control device 70 includes an engine control means, i.e., an engine control portion 72 and a shift control means, i.e., a shift control portion 74.

The engine control portion 72 applies the accelerator opening degree θacc and the vehicle speed V (synonymous with the AT output rotation speed No etc.) to, for example, a relationship (e.g., an engine torque map) obtained empirically or through design and stored in advance (i.e. predefined) so as to set a target engine torque Tetgt and outputs the engine control command signal Se for providing the output control of the engine 12 to a throttle actuator, a fuel injection device, an ignition device, etc. such that the target engine torque Tetgt is acquired.

The shift control portion 74 uses, for example, a predefined relationship (shift map, shift diagram) to determine whether to provide a control of switching the gear position of the automatic transmission 22, and thereby determines a shift of the automatic transmission 22. The shift control portion 74 applies the vehicle speed V and the accelerator opening degree θacc to the shift map to determine the shift of the automatic transmission 22 (i.e., determine the gear position to be established in the automatic transmission 22). The shift control portion 74 outputs as the hydraulic control command signal Sat to the hydraulic control circuit 50 a shift command for engaging and/or releasing the engagement devices C involved in the shift of the automatic transmission 22 so as to establish the determined gear position.

The shift map is a predetermined relationship having shift lines for determining the shift of the automatic transmission 22 on two-dimensional coordinates having the vehicle speed V and the accelerator opening degree θacc as variables. The shift lines in the shift map are up lines for determining an upshift and down lines for determining a downshift. The up lines and the down lines are each determined in advance between gear positions having a difference of one speed from each other in a plurality of gear positions. The shift lines are each used for determining whether the line is crossed by the actual vehicle speed V on a line indicative of a certain accelerator opening degree θacc or whether the line is crossed by the actual accelerator opening degree θacc on a line indicative of a certain vehicle speed V, i.e., whether the vehicle speed V or the accelerator opening degree θacc has crossed a value (shift point) on the shift line at which a shift should be executed, and are each defined in advance as a series of the shift points. Instead of the vehicle speed V, the shift determination using the shift map may be made by using a vehicle speed related value related to the vehicle speed V, for example, a wheel speed or the AT output rotation speed No. Instead of the accelerator opening degree θacc, the determination may be made by using a drive request amount representative of a magnitude of a drive. request from a driver to the vehicle 10 as is the case with the accelerator opening degree θacc, for example, a required drive force Fdem [N], a required drive torque [Nm], or a required drive power [W]. Additionally, the throttle valve opening degree 9th [%], the intake air amount [g/sec], etc. can simply be used as the drive request amount.

At the time of the shift of the automatic transmission 22, the shift control portion 74 performs a so-called clutch-to-clutch shift making a change in engagement of the engagement devices involved in the shift of the automatic transmission 22 as the predetermined engagement devices out of the engagement devices C (i.e., switching the engagement and release of the predetermined engagement devices). For example, in the 2-to-3 upshift from the second speed gear position "2nd" to the third speed gear position "3rd", a change in engagement is made between the first brake B1 and the third clutch C3 (i.e., the clutch-to-clutch shift is performed by releasing the first brake B1 and engaging the third clutch C3). In this example, out of the engagement devices C to be changed in engagement at the time of the shift, an engagement device to be released is referred to as a release-side engagement device (also referred to as a release element), and an engagement device to be engaged is referred to as an engagement-side engagement device (also referred to as an engagement element). The hydraulic control command signal Sat is a release-element instruction pressure for acquiring a clutch torque (also referred to as a release-side clutch torque) of the release element at the time of the shift and an engagement-element instruction pressure for acquiring a clutch torque (also referred to as an engagement-side clutch torque) of the engagement element at the time of the shift.

The shift control portion 74 uses a gear train motion equation of the automatic transmission 22 acquired by formulating a relationship of, for example, a shift target value, the release-side clutch torque, the engagement-side clutch torque, and the input torque Ti (=the turbine torque Tt) that is the torque on the transmission input shaft 32, to calculate required values of the release-side clutch torque and the engagement-side clutch torque at the time of the shift achieving the shift target value, and outputs the hydraulic control command signal Sat (the release-element instruction pressure and the engagement-element instruction pressure) for acquiring these required values to the hydraulic control circuit 50. When a torque ratio t of the torque converter 20 is taken into account, the turbine torque Tt has the same meaning as the engine torque Te (=Tt/t).

The gear train motion equation during the shift of the automatic transmission 22 is derived from, for example, a motion equation of each of the mutually coupled rotating elements constituting the automatic transmission 22 and relationship equations in the planetary gear devices 36, 38, 40 constituting the automatic transmission 22. The motion equation of each of the rotating elements is a motion equation defining a torque expressed by the product of the inertia and the rotation speed temporal change rate in each of the rotating elements by using torque acting on the three members (the sun gear, the carrier, the ring gear) of the planetary gear devices 36, 38, 40, and the members involved in the rotating elements out of the members on both sides of the engagement devices C. The relationship equations in the planetary gear devices 36, 38, 40 are relationship equations respectively defining the relationship of torque and the relationship of the rotation speed temporal change rate in the three members of the planetary gear devices 36, 38, 40 by using the gear ratios $\rho 1$, $\rho 2$, $\rho 3$ of the planetary gear devices 36, 38, 40. The constants in the gear train motion equation are coefficients defined through design from the inertia of the rotating elements and the gear ratios $\rho 1$, $\rho 2$, $\rho 3$ of the planetary gear devices 36, 38, 40.

The shift target value is a target value of a factor defining a change mode desired to be achieved at the time of the shift. The factor defining a change mode desired to be achieved at the time of the shift is, for example, a shift time or a drive force. An example of the factor capable of expressing the shift time is a time differential, i.e., a temporal change rate, of the turbine rotation speed Nt (=AT input rotation speed Ni), in other words, an input shaft angular acceleration dNt/dt that is the speed change amount of the transmission input shaft 32. An example of the factor capable of expressing the drive force is an output torque To that is the torque on the transmission output gear 24. The shift control portion 74 uses, for example, a relationship (an input shaft angular acceleration change map) of a predefined mode of changing the input shaft angular acceleration dNt/dt such that a change in the turbine rotation speed Nt during the inertia phase becomes a predetermined change satisfying both the shift shock suppression and the shift time, so as to calculate the target value of the input shaft angular acceleration dNt/dt in transition of the shift. The shift control portion 74 also calculates the output torque To (=Tetgt*the torque ratio t*the gear ratio $\gamma$) by using the target engine torque Tetgt, for example, and calculates the target value of the output torque To in transition of the shift such that the output torque To is changed at a predefined change rate in transition of the shift (particularly in the torque phase).

The shift control by the shift control portion 74 at the time of a drive upshift (also referred to as a power-on upshift) of the automatic transmission 22 will be described in detail. When the shift command at the time of the drive upshift is started, first, a release-element instruction pressure for preparing to reduce a clutch pressure of the release element (also referred to as a release-side clutch pressure) is output, and an engagement-element instruction pressure for packing of the engagement element is output. After an elapse of a predetermined time required for the packing, a torque phase control is provided in which an engagement-element instruction pressure is output for gradually increasing the hydraulic pressure of the engagement element (also referred to as an engagement-side clutch pressure) to generate the engagement-side clutch torque. In accordance with this torque phase control, a release-side torque phase control is provided in which a release-element instruction pressure is output for gradually reducing the release-side clutch pressure to lower the release-side clutch torque. During the torque phase in transition of the shift, the output torque To is gradually reduced toward the target value after the upshift as the engagement-side clutch torque increases. When the output torque To is set to the target value after the upshift and the torque phase is terminated, the turbine rotation speed Nt is reduced toward a synchronous rotation speed after the shift (=No*the speed change ratio $\gamma$ after the shift) as the release element starts slipping, and the inertia phase is started. The turbine rotation speed Nt reaches the synchronous rotation speed after the shift and the inertia phase is terminated. Subsequently, as the upshift is completed, the engagement-element instruction pressure is set to the maximum value while the release-element instruction pressure is set to the minimum value (zero value), and a sequence of the shift control is terminated. The drive upshift of the automatic transmission 22 is an upshift of the automatic transmission 22 performed in a drive state that is a state in which the torque based on the engine torque Te transmitted toward the drive wheels 14 in the automatic transmission 22 is larger than the torque based on a road load transmitted toward the engine 12 in the automatic transmission 22.

As described above, in the shift control during the drive upshift of the automatic transmission 22, the torque is transferred between the release element and the engagement element during the torque phase. If one clutch torque is small between the release-side clutch torque and the engagement-side clutch torque when the shift target value is largely switched as in the case of the start of the torque phase or the end thereof (the start of the inertia phase) during the shift, a sudden change may occur in the output torque To and the speed of the transmission input shaft 32 as compared to the target value due to a response delay, variation, etc. of the actual clutch pressure with respect to the instruction pressure, possibly increasing the shift shock. Therefore, at the time of the drive upshift of the automatic transmission 22, it is conceivable that the transfer of the torque during the torque phase is controlled to the tie-up side so as to suppress the shift shock while preventing the engine 12 from racing. Considering preventing the start time point of the torque phase control from changing, the controlling to the tie-up side is achieved by delaying the time point of starting the provision of the release-side torque phase control of reducing the release-side clutch torque during the torque phase.

In the region in which the input torque Ti is relatively low, the engagement-side clutch torque is lowered, which increases the susceptibility to variations in the actual engagement-side clutch pressure with respect to the instruction pressure, variations in return spring load of the engagement element, etc. In this regard, by controlling the transfer of the torque during the torque phase to the tie-up side, the engagement-side clutch torque may be used in a relatively high region, so that the controllability of the engagement-side clutch torque can be improved. On the other hand, in the region in which the input torque Ti is relatively high, the inertia phase cannot be started unless the engagement-side clutch torque is increased in accordance with the controlling to the tie-up side. However, if the engagement-side clutch pressure until the start of the inertia phase is increased in a high load region, a vehicle condition belongs to a region of high differential rotation and high clutch torque, possibility increasing the frictional load of the engagement element (i.e., a load of a friction material). The high input torque Ti means that the transmission torque of the release element before the start of the torque phase of the drive upshift is high and that the release-element instruction pressure is also high. In the region in which the release-element instruction pressure before the start of the torque phase of the drive upshift is relatively high, the reduction of the actual release-side clutch pressure is delayed, and this may also make it impossible to start the inertia phase unless the engagement-side clutch torque is increased.

Therefore, when the transmission torque of the release element before the start of the torque phase in the drive upshift is high, the electronic control device 70 shortens a delay time tdel at the time of delaying the time point of starting the provision of the release-side torque phase control of reducing the release-side clutch torque during the torque phase, as compared to when the transmission torque is low.

Since the engagement-side clutch torque is not generated before the start of the torque phase control (synonymous with before the start of the torque phase) in the drive upshift, the transmission torque of the release element before the start of the torque phase is a value before the start of the torque phase control of the transmission torque of the release element engaged at the time of establishment of the gear position before the shift, in transition of the drive upshift. The transmission torque of the release element engaged at the time of establishment of the gear position before the shift is a transmission torque assigned to the release element out of the transmission torques corresponding to the input torque Ti assigned to the release element and the engagement devices C other than the release element, which are engaged at the time of establishment of the gear position before the shift, and is referred to as a shared torque of the release element (hereinafter referred to as a release-element shared torque). The sharing proportions of the input torque Ti assigned to the release element and the engagement devices C other than the release element engaged at the time of establishment of the gear position before the shift are defined in advance for each of the gear positions. Therefore, the electronic control device 70 calculates the release-element shared torque by multiplying the input torque Ti by the sharing proportion of the release element. A period before the start of the torque phase in the drive upshift is from the shift control start time point of the drive upshift (e.g., the time point of the shift determination or the time point of output of the shift command) to the torque phase start time point, more preferably, the torque phase control start time point (synchronous with the torque phase start time point).

To implement the control of delaying the time of starting the provision of the release-side torque phase control as described above, the electronic control device 70 further includes a delay time setting means, i.e., a delay time setting portion 76, and a control state determining means, i.e., a control state determining portion 78.

The shift control portion 74 provides a delay control of delaying the time of starting the provision of the release-side torque phase control of reducing the release-side clutch torque during the torque phase in the drive upshift, by a preset delay time tdel, with respect to the time point of starting the provision of the torque phase control of generating the engagement-side clutch torque (i.e., the start time point of the torque phase). The delay time setting portion 76 sets the delay time tdel in advance such that the delay time tdel is shortened when the release-element shared torque before the start of the torque phase in the drive upshift is high, as compared to when the torque is low.

Specifically, the control state determining portion 78 determines whether the shift control by the shift control portion 74 is a drive upshift. If determining that the shift control is the drive upshift, the control state determining portion 78 determines whether the shift control portion 74 starts the torque phase control of outputting the engagement-element instruction pressure for gradually increasing the engagement-side clutch pressure to generate the engagement-side clutch torque after output of the engage-element instruction pressure for packing of the engagement element (i.e., whether it is after the start of the torque phase control by the shift control portion 74). If determining that the torque phase control is started, the control state determining portion 78 determines whether the inertia phase of the drive upshift is before being started, based on whether the turbine rotation speed Nt is reduced by a predetermined rotation speed or more with respect to the synchronous rotation speed before the shift (=No*the speed change ratio γ before the shift), for example. This predetermined rotation speed is a predefined threshold value for determining the turbine rotation speed Nt reduced to the extent that the start of the inertia phase can be judged, for example. Additionally, if determining that the torque phase control is started, the control state determining portion 78 determines whether the delay control by the shift control portion 74 is at the start time point. Since the delay control is started from the start time point of the torque phase control, determining whether the delay control is at the start time point is to determine whether the torque phase control is at the start time point (i.e., the torque phase is at the start time point). Therefore, if it is determined that the torque phase control is started, it is determined that the delay control is at the start time point when it is first determined whether the delay control is at the start time point.

Figure 4:
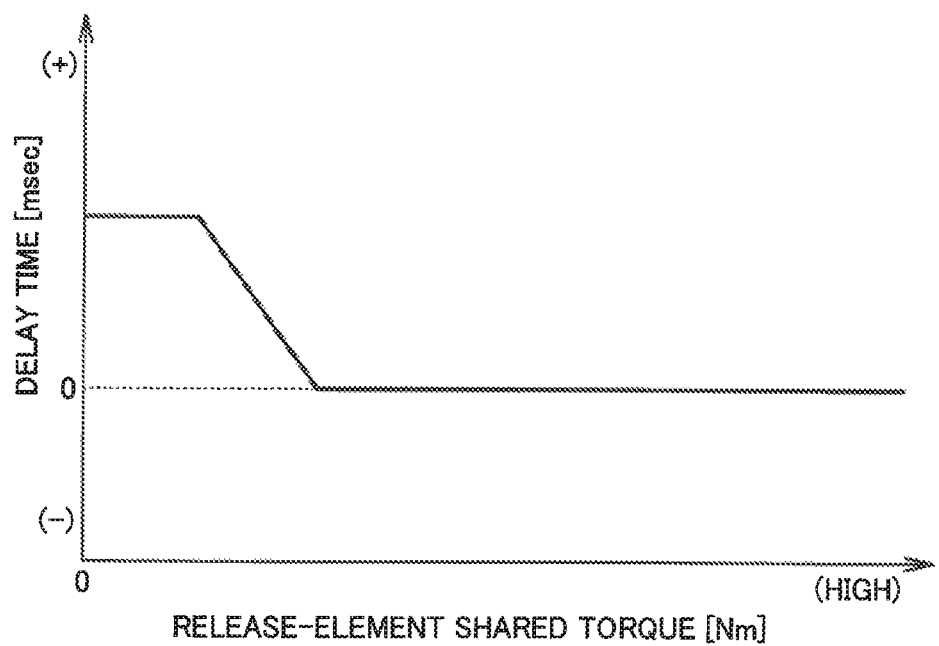
FIG. 4 is a diagram of an example of a predetermined relationship in which a delay time corresponding to a release-element shared torque is set.

If the control state determining portion 78 determines that the delay control by the shift control portion 74 is at the start time point, the delay time setting portion 76 retains a value (information) of the release-element shared torque at this start time point. The delay time setting portion 76 applies the release-element shared torque at the delay control start time point to a predefined relationship (delay time map) as shown in FIG. 4, for example, and thereby sets the delay time tdel. The delay time map of FIG. 4 is a predetermined relationship in which the delay time corresponding to the release-element shared torque is defined in advance, for example, and has the delay time tdel set to a constant value or made shorter when the release-element shared torque is higher. As shown in FIG. 4, the delay time setting portion 76 sets the delay time tdel in advance such that the delay time tdel is shortened when the release-element shared torque at the delay control start time point (i.e., the torque phase control start time point) is high, as compared to when the torque is low. The delay time map of FIG. 4 is a predetermined relationship at the time of the 2-to-3 drive upshift, for example, and the delay time map as shown in FIG. 4 is defined in advance for each gear position of respective drive upshift destination (after the drive upshift), for example. Therefore, the delay time setting portion 76 sets the delay time tdel based on the gear position of the drive upshift destination of the automatic transmission 22.

If the engagement devices C are operated at a low hydraulic fluid temperature THoil, the responsiveness of the engagement devices C may become lower because of high viscosity of the hydraulic fluid oil. Alternatively, if the hydraulic fluid temperature THoil is high, the responsiveness of the engagement devices C may become lower because of leakage of the hydraulic fluid from a gap etc. of the solenoid valves SL1 to SL6 disposed in the hydraulic control circuit 50 involved in the supply of hydraulic pressure to the engagement devices C. In the region of the hydraulic fluid temperature THoil at which the responsiveness of the engagement devices C during the drive upshift becomes lower, the reduction of the actual release-side clutch pressure is delayed with respect to the release-element instruction pressure, and this may also make it impossible to start the inertia phase unless the engagement-side clutch torque is increased. Therefore, the delay time setting portion 76 sets the delay time tdel in advance such that the delay time tdel is shortened when the engagement devices C (particularly, the predetermined engagement devices involved in the drive upshift) have low responsiveness corresponding to the hydraulic fluid temperature THoil before the start of the torque phase in the drive upshift, as compared to when the responsiveness is high.

Specifically, when the control state determining portion 78 determines that the delay control by the shift control portion 74 is at the start time point, the delay time setting portion 76 retains a value (information) of the hydraulic fluid temperature THoil at this start time point and sets the delay time tdel based on the hydraulic fluid temperature THoil. For example, when the hydraulic fluid temperature THoil is lower than a predetermined low oil temperature, the delay time setting portion 76 shortens the delay time tdel as compared to when the temperature is higher. This predetermined low oil temperature is a predefined threshold value for determining the viscosity of the hydraulic fluid oil made higher to the extent that the responsiveness of the engagement devices C can hardly be ensured, for example. Alternatively, when the hydraulic fluid temperature THoil is higher than a predetermined high oil temperature, the delay time setting portion 76 shortens the delay time tdel as compared to when the temperature is lower. This predetermined high oil temperature is, for example, a value higher than the predetermined low oil temperature and is a predefined threshold value for determining the presence of leakage of the hydraulic fluid oil from a valve to the extent that the responsiveness of the engagement devices C can hardly be ensured. More preferably, the delay time setting portion 76 sets a value of a coefficient to one when the hydraulic fluid temperature THoil is equal to or higher than the predetermined low oil temperature and the hydraulic fluid temperature THoil is equal to or lower than the predetermined high oil temperature, and sets the value of the coefficient to a value larger than one when the hydraulic fluid temperature THoil is low as compared to the predetermined low oil temperature (or is lower than the predetermined low oil temperature) and/or when the hydraulic fluid temperature THoil is high as compared to the predetermined high oil temperature (or is higher than the predetermined high oil temperature). The delay time setting portion 76 then sets the delay time tdel based on a corrected release-element shared torque acquired by multiplying the release-element shared torque at the start time point of the delay control by the coefficient described above.

The shift control portion 74 delays the start time point of the release-side torque phase control of outputting the release-element instruction pressure for gradually reducing the release-side clutch pressure in the torque phase, with respect to the start time point of the torque phase control of outputting the engagement-element instruction pressure for gradually increasing the engagement-side clutch pressure to generate the engagement-side clutch torque, by the delay time tdel preset by the delay time setting portion 76. In other words, the shift control portion 74 employs the delay time tdel as a time-delay to delay the output of the release-element instruction pressure for acquiring the required value of the release-side clutch torque at the time of the shift calculated by using the gear train motion equation of the automatic transmission 22 after the torque phase start time point.

In the release-side torque phase control, the output of the release-element instruction pressure may be delayed by a constant delay time tdel, or may be delayed by a delay time tdel made longer as the release-side clutch torque becomes lower. Therefore, the delay time setting portion 76 may set the delay time tdel made longer as the release-side clutch torque becomes lower. For example, the delay time setting portion 76 sets the delay time tdel such that the delay time tdel is made longer as the release-side clutch torque becomes lower when the release-side clutch torque becomes equal to or less than a predetermined value of torque. Alternatively, the delay time setting portion 76 sets the delay time tdel in advance such that the delay time tdel is made longer in the region in which the release-side clutch torque becomes equal to or less than a predetermined value of torque, as compared to the region in which the release-side clutch torque exceeds the predetermined value of torque. This predetermined value of torque is a predefined threshold value for determining that the delay time tdel should be made longer so as to stabilize a tie-up amount at the start of the inertia phase, for example. This is expected to provide an effect of alleviating the reduction in the release-side clutch torque and stabilizing the tie-up amount at the start of the inertia phase in the region in which the release-side clutch torque is lowered. Such a mode of varying the delay time tdel is particularly useful when the release-side clutch torque is reduced with a short delay time tdel because the input torque Ti is in a high region.

Specifically, the delay time setting portion 76 sets the delay time tdel such that the delay time tdel is made longer in a region in which a torque sharing ratio of the release element is equal to or less than a predetermined sharing ratio in terms of the torque sharing ratio between the release element and the engagement element in transition of the drive upshift after the start of the delay control by the shift control portion 74, as compared to a region in which the torque sharing ratio of the release element exceeds the predetermined sharing ratio. This predetermined sharing ratio is a predefined threshold value for determining that the delay time tdel should be made longer so as to stabilize the tie-up amount at the start of the inertia phase, for example. The torque sharing ratio between the release element and the engagement element in transition of the shift represents the transfer of the torque between the release element and the engagement element. The torque sharing ratio is a torque sharing ratio of the transmission torque shared by the releasing element and the engaging element when the transmission torques assigned to both of the engagement devices in transition of the shift are converted into the torque on the transmission input shaft 32, for example. Therefore, if the total torque sharing ratio of the torque sharing ratio of the release element and the torque sharing ratio of the engagement element exceeds one, this means that the transfer of the torque is controlled to the tie-up side.

If the release-side torque phase control is provided after a delay of the delay time tdel, the progress of the drive upshift may be stagnated by tie-up after the start of the inertia phase. Therefore, if the control state determining portion 78 determines that the inertia phase in the drive upshift has been started, the shift control portion 74 terminates the delay control and promptly reduces the release-element instruction pressure (i.e., promptly reduces the release-side clutch torque) so as to prevent or suppress the stagnation of the drive upshift as described above.

Figure 5:
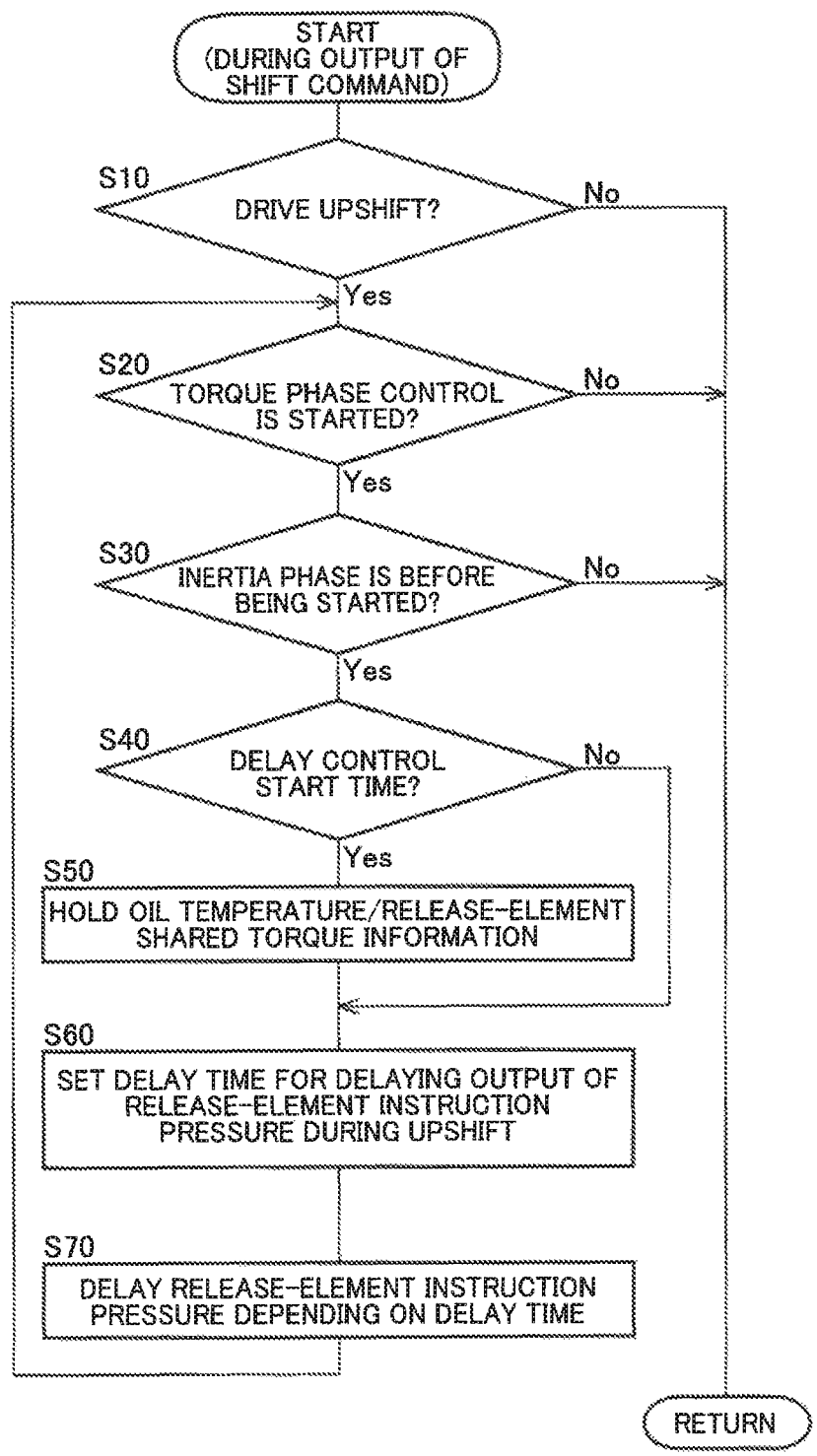
FIG. 5 is a flowchart for explaining a main portion of the control operation of an electronic control device, i.e., the control operation for providing a tie-up control corresponding to a frictional load of an engagement element during a torque phase in a drive upshift.
Figure 6:
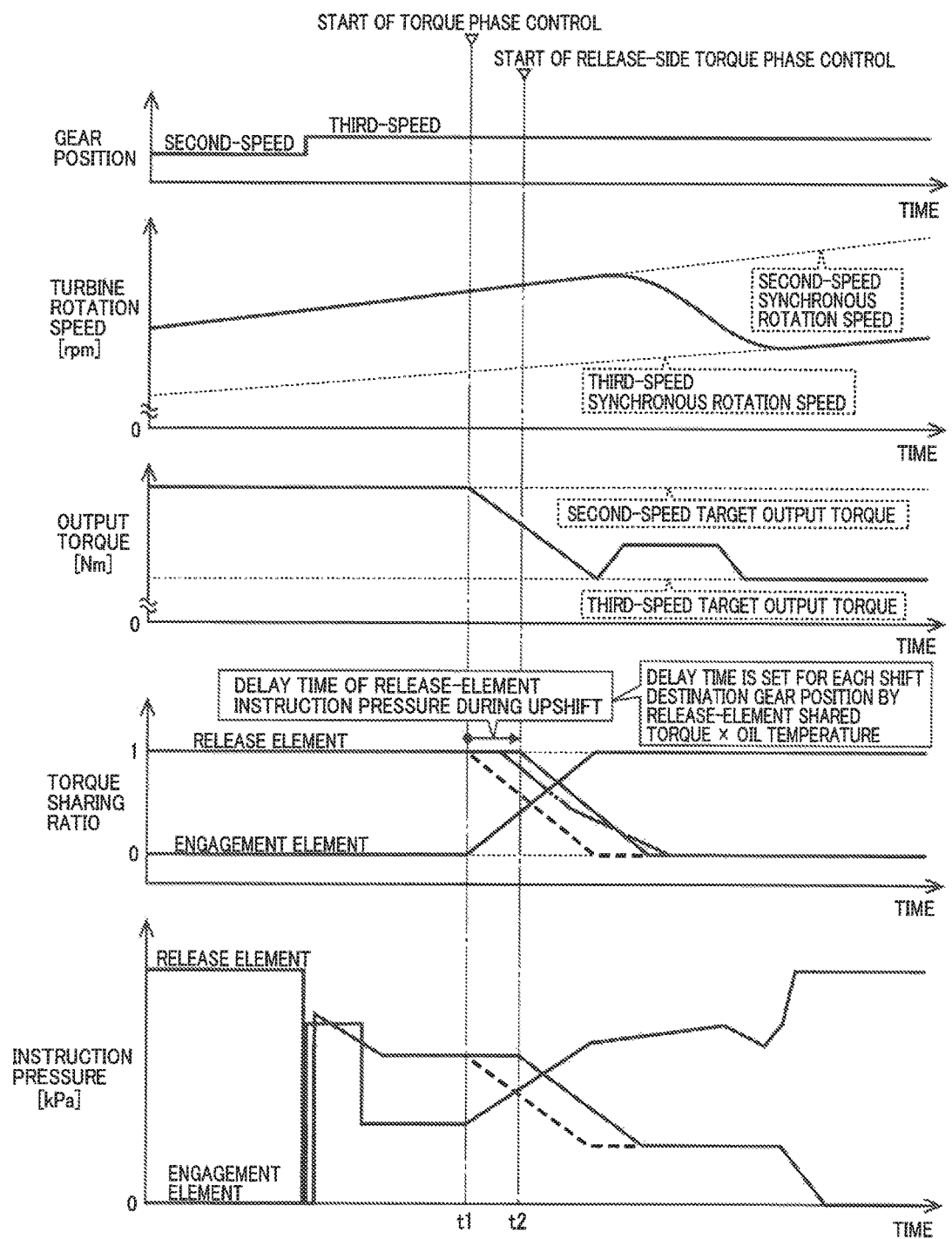
FIG. 6 is a diagram of an example of a time chart when the control operation shown in the flowchart of FIG. 5 is executed.
Figure 7:
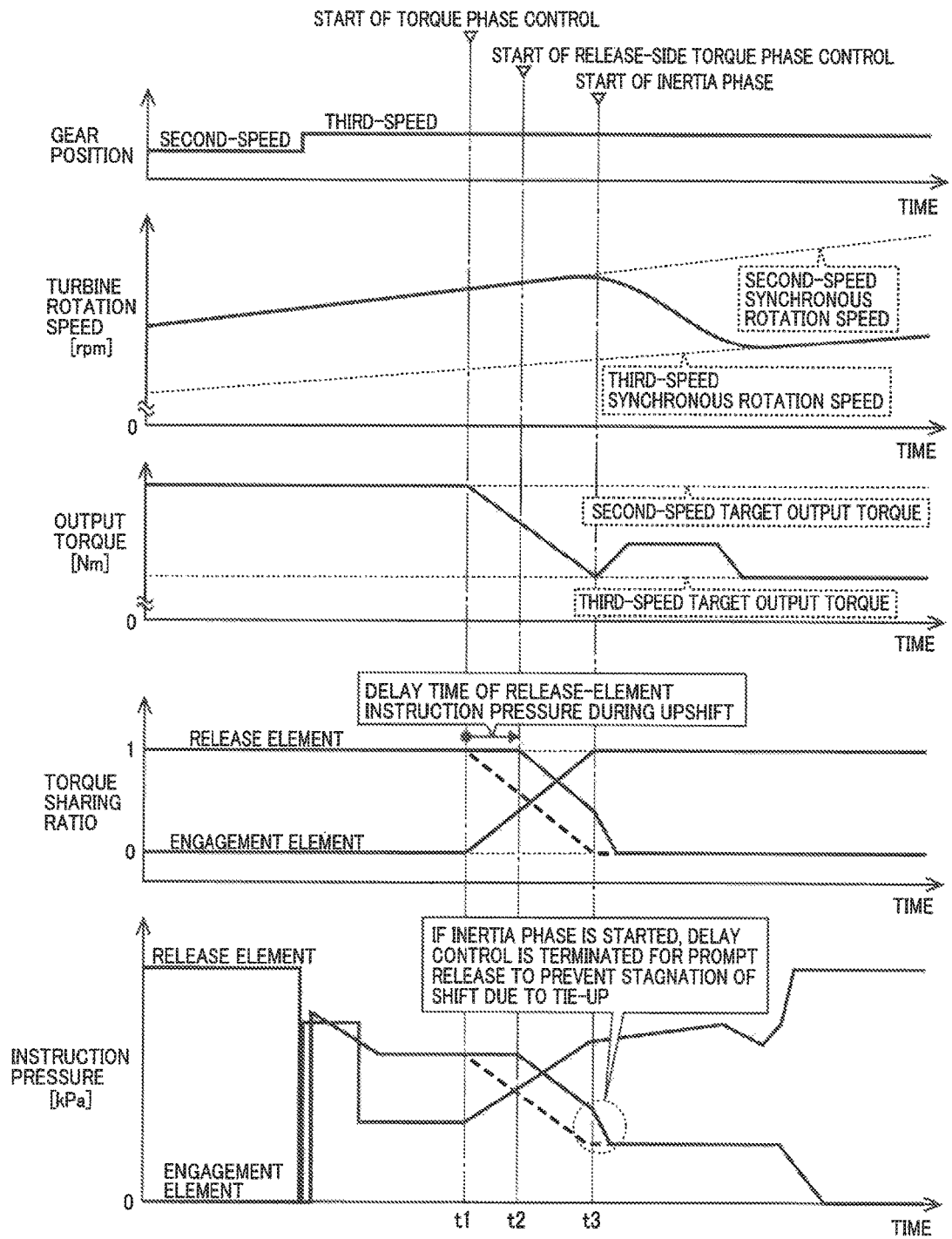
FIG. 7 is a diagram of an example of a time chart when the control operation shown in the flowchart of FIG. 5 is executed, showing an embodiment different from FIG. 6.

FIG. 5 is a flowchart for explaining a main portion of the control operation of the electronic control device 70, i.e., the control operation for providing the tie-up control corresponding to the frictional load of the engagement element during the torque phase in the drive upshift, and is repeatedly executed during the output of the shift command of the automatic transmission 22, for example. FIGS. 6 and 7 are diagrams of respective examples of a time chart when the control operation shown in the flowchart of FIG. 5 is executed.

In FIG. 5, first, at step (hereinafter, step is omitted) S10 corresponding to the function of the control state determining portion 78, it is determined whether the shift control is the drive upshift (i.e., whether the output of the shift command is a command to execute an upshift in the driving state of the vehicle). If the determination at S10 is negative, this routine is terminated. If the determination at S10 is affirmative, it is determined at S20 corresponding to the function of the control state determining portion 78 whether the torque phase control is started (i.e., whether it is after the start of the torque phase control). If the determination at S20 is negative, this routine is terminated. If the determination at S20 is affirmative, it is determined at S30 corresponding to the function of the control state determining portion 78 whether the inertia phase is before being started. If the determination at S30 is negative, this routine is terminated. If the determination at S30 is affirmative, it is determined at S40 corresponding to the function of the control state determining portion 78 whether the delay control is at the start time point. If the determination at S40 is affirmative, the value (information) of the hydraulic fluid temperature THoil and the value (information) of release-element shared torque are retained (stored) at S50 corresponding to the function of the delay time setting portion 76. If the determination at S40 is negative, or after S50, the delay time tdel for delaying the output of the release-element instruction pressure at the time of drive upshift is set based on the hydraulic fluid temperature THoil and the release-element shared torque at S60 corresponding to the function of the delay time setting portion 76. Subsequently, at S70 corresponding to the function of the shift control portion 74, the output of release-element instruction pressure is delayed depending on the delay time tdel. Following S70, S20 described above is executed.

FIG. 6 shows an example of embodiments at the time of a 2-to-3 drive upshift. In FIG. 6, the release-element instruction pressure and the engagement-element instruction pressure are output as the shift command of the 2-to-3 drive upshift. Since this is the drive upshift, the torque is transferred between the release element and the engagement element before the start of the inertia phase (i.e., during the torque phase). Time t1 indicates a time point at which the torque phase control is started by the output of the engagement-element instruction pressure for acquiring the required value of the engagement-side clutch torque at the time of the 2-to-3 drive upshift calculated by using the gear train motion equation of the automatic transmission 22 (i.e., the time point at which the torque phase is started). The broken lines of the release-element instruction pressure and the torque sharing ratio of the release element indicate an embodiment in the case of starting the output of the release-element instruction pressure for acquiring the required value of the engagement-side clutch torque at the time of the 2-to-3 drive upshift calculated by using the gear train motion equation of the automatic transmission 22 (i.e., the release-side torque phase control) at time t1 without delay. The solid lines of the release-element instruction pressure and the torque sharing ratio of the release element indicate an embodiment in the case of starting the output of the release-element instruction pressure at time t2 with a delay of a certain delay time tdel with respect to the embodiment of the broken lines after the torque phase start time point. Therefore, the solid lines of the release-element instruction pressure and the torque sharing ratio of the release element indicate an embodiment in the case of delaying the start time point of the release-side torque phase control of outputting the release-element instruction pressure during the torque phase by the delay time tdel with respect to the start time point of the torque phase control of outputting the engagement-element instruction pressure. The dashed-two dotted line of the torque sharing ratio of the release element indicates an embodiment in the case of making the delay time tdel longer when the torque sharing ratio of the release element is smaller in the region in which the torque sharing ratio of the release element is equal to or less than the predetermined sharing ratio after the start of the delay control of the output of the release-element instruction pressure (i.e., during the delay control).

FIG. 7 shows an example of embodiments at the time of the 2-to-3 drive upshift as is the case with FIG. 6. The points different from FIG. 6 will mainly be described. In FIG. 7, the solid lines of the release-element instruction pressure and the torque sharing ratio of the release element indicate an embodiment in the case of starting the output of the release-element instruction pressure at time t2 with a delay of the certain delay time tdel with respect to the embodiment of the broken lines after the torque phase start time point and then terminating the delay control to promptly reduce the release-element instruction pressure (i.e., promptly reduce the release-side clutch torque) after time t3 when the inertia phase is started.

As described above, according to this example, in the presetting of the delay time tdel in the delay control of delaying the time point of starting the provision of the release-side torque phase control of reducing the release-side clutch torque with respect to the time point of starting the provision of the torque phase control of generating the engagement-side clutch torque during the torque phase in the drive upshift, the delay time tdel is shortened when the release-element shared torque before the start of the torque phase in the drive upshift is high, as compared to when the release-element shared torque is low, and therefore, the drive upshift can be performed with a tie-up corresponding to the frictional load of the engagement element changing in accordance with the input torque Ti that is the basis of the release-element shared torque before the start of the torque phase. Thus, the tie-up control corresponding to the frictional load of the engagement element can be provided during the torque phase in the drive upshift.

According to this example, in the region in which the torque sharing ratio of the release element in transition of the drive upshift is equal to or less than the predetermined sharing ratio after the start of the delay control, the delay time tdel is set longer as compared to the region in which the torque sharing ratio exceeds the predetermined sharing ratio, and therefore, the reduction in the release-side clutch torque is alleviated in the region in which the release-side clutch torque becomes lower, so that the tie-up at the start of the inertia phase is stabilized.

According to this example, when the inertia phase in the drive upshift is started, the delay control is terminated, so that the stagnation of the drive upshift due to tie-up can be prevented or suppressed.

According to this example, since the delay time tdel is set based on the gear position of the drive upshift destination of the automatic transmission 22, the drive upshift can be performed with the tie-up corresponding to the frictional load of the engagement element in accordance with the gear position of the drive upshift destination.

According to this example, since the delay time tdel is set in accordance with the hydraulic fluid temperature THoil before the start of the torque phase in the drive upshift, the stability of control during the torque phase can be improved with respect to a change in the hydraulic fluid temperature THoil.

Although the example of the present invention has been described in detail with reference to the drawings, the present invention can be also applied in other forms.

For example, although the value (information) of the hydraulic fluid temperature THoil and the value (information) of the release-element shared torque at the start time point of the delay control are retained in the example described above, the present invention is not limited to this form. For example, these values (pieces of information) may be values before the start of the torque phase in the drive upshift (from the shift control start time point to the torque phase start time point of the drive upshift). For example, in the case of the embodiment in which the values at the shift control start time point of the drive upshift are retained, S40 of the flowchart of FIG. 5 is not included, and S50 is executed when the determination of S10 is affirmative. Additionally, it is not always necessary to set the delay time tdel based on the hydraulic fluid temperature THoil. In this way, the flowchart of FIG. 5 may appropriately be changed.

Although the eight forward speed gear positions are established in the automatic transmission 22 in the example described above, the present invention is not limited to this form. The automatic transmission 22 may be any multi-speed transmission in which a plurality of gear positions different in gear ratio selectively established by controlling engagement and release of predetermined engagement devices out of a plurality of engagement devices. The multi-speed transmission may be a planetary gear type automatic transmission such as the automatic transmission 22 or may be an automatic transmission that is a synchronous meshing type parallel two-shaft automatic transmission such as a known DCT (dual clutch transmission) including two systems of input shafts.

Although the engine 12 is exemplified as the drive force source of the vehicle 10 in the example described above, the present invention is not limited to this form. For example, another motor such as an electric motor may be employed alone or in combination with the engine 12, as the drive force source. Although the power of the engine 12 is transmitted via the torque converter 20 to the automatic transmission 22, the present invention is not limited to this form. For example, another fluid transmission device such as a fluid coupling without a torque amplification effect may be used instead of the torque converter 20. Alternatively, this fluid transmission device may not necessarily be provided in the vehicle.

The above description is merely an embodiment and the present invention can be implemented in variously modified and improved forms based on the knowledge of those skilled in the art.

REFERENCE SIGNS LIST

10: Vehicle
22: Automatic transmission (Multi-speed transmission)
70: Electronic control device (Control device)
74: Shift control portion
76: Delay time setting portion
C1 to C4: First to fourth clutch (Engagement device)
B1, B2: First, second brake (Engagement device)

What is claimed is:

1. A control device of a vehicle including a multi-speed transmission having a plurality of gear positions different in gear ratio selectively established by controlling engagement and release of predetermined engagement devices out of a plurality of engagement devices, the control device comprising:
   a shift control portion configured to provide a delay control of delaying a time point of starting provision of a release-side torque phase control reducing a torque capacity of a release-side engagement device by a preset delay time with respect to a time point of starting provision of a torque phase control generating a torque capacity of an engagement-side engagement device during a torque phase in a drive upshift; and
   a delay time setting portion configured to preset the delay time such that the delay time is shortened when a shared torque of the release-side engagement device before start of the torque phase in the drive upshift is high, as compared to when the shared torque is low.

2. The control device of a vehicle according to claim 1, wherein the delay time setting portion sets the delay time such that delay time is made longer in a region in which a torque sharing ratio of the release-side engagement device is equal to or less than a predetermined sharing ratio in terms of a torque sharing ratio between the release-side engagement device and the engagement-side engagement device in transition of the drive upshift after the start of the delay control, as compared to in a region in which the torque sharing ratio of the release-side engagement device exceeds the predetermined sharing ratio.

3. The control device of a vehicle according to claim 1, wherein the shift control portion terminates the delay control when the inertia phase in the drive upshift is started.

4. The control device of a vehicle according to claim 1, wherein the delay time setting portion sets the delay time based on a gear position of the drive upshift destination of the multi-speed transmission.

5. The control device of a vehicle according to claim 1, wherein the delay time setting portion sets the delay time such that the delay time is shortened when the predetermined engagement devices have low responsiveness due to a temperature of hydraulic fluid for shift control of the multi-speed transmission before start of the torque phase in the drive upshift, as compared to when the responsiveness is high.

* * * * *